P. GENOVESE.
CUSHION HEAD FOR MOTOR CYCLES AND BICYCLES.
APPLICATION FILED OCT. 29, 1915.
1,188,168.
Patented June 20, 1916.
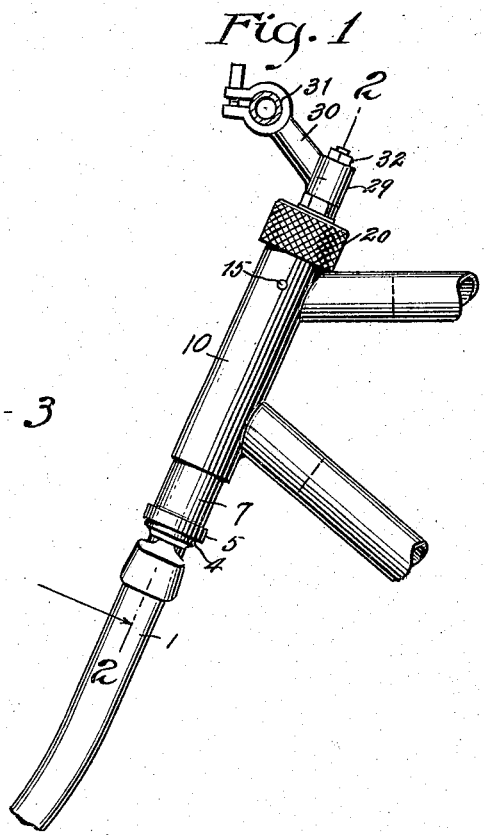
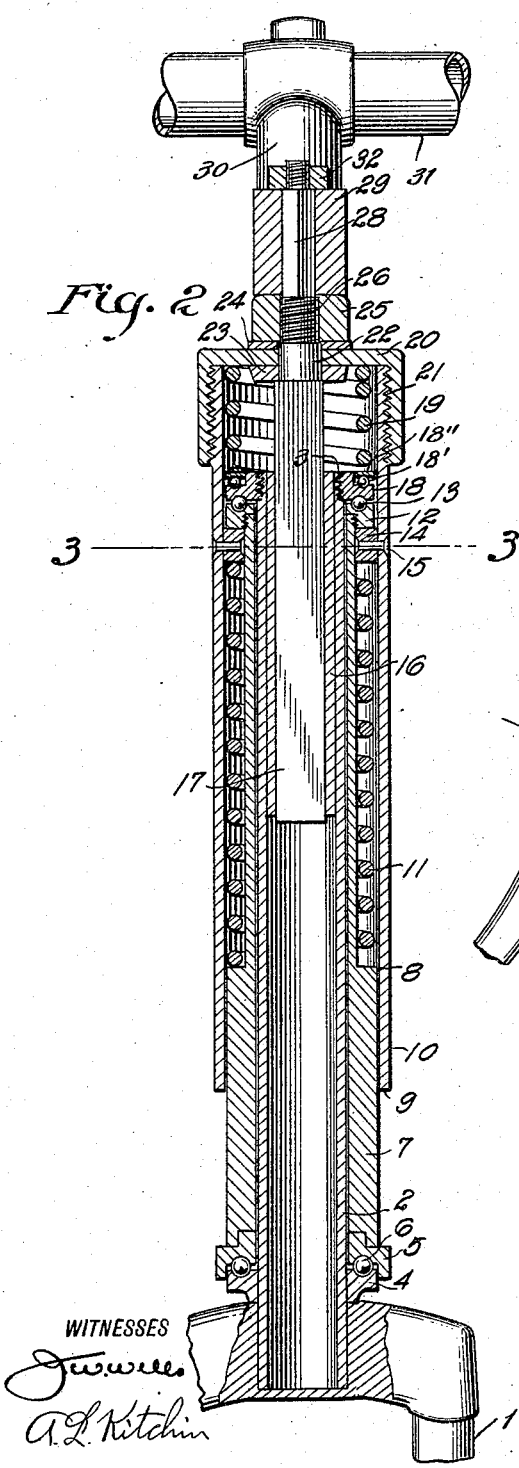
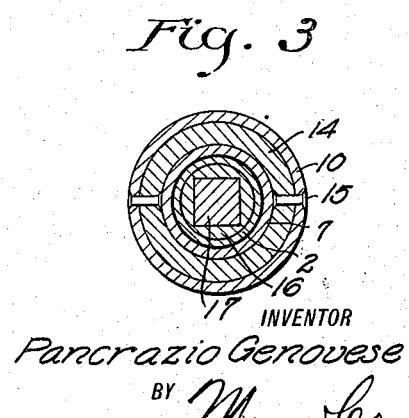
WITNESSES
INVENTOR
Pancrazio Genovese
BY
ATTORNEYS

UNITED STATES PATENT OFFICE.

PANCRAZIO GENOVESE, OF NEW YORK, N. Y.

CUSHION-HEAD FOR MOTOR-CYCLES AND BICYCLES.

1,188,168.   Specification of Letters Patent.   Patented June 20, 1916.

Application filed October 29, 1915. Serial No. 58,564.

*To all whom it may concern:*

Be it known that I, PANCRAZIO GENOVESE, a subject of the King of Italy, and a resident of the city of New York, borough of the Bronx, in the county of Bronx and State of New York, have invented a new and Improved Cushion-Head for Motor-Cycles and Bicycles, of which the following is a full, clear, and exact description.

This invention relates to cushion devices and particularly to a cushion head for bicycles, motorcycles and similar devices, and has for an object the provision of an improved construction and arrangement whereby the jolts and jars of the front wheel of a bicycle or motorcycle are taken up by one or more springs.

Another object in view is to provide a head for bicycles or motorcycles arranged with telescoping parts and a spring between certain of the telescoping parts for resiliently resisting the upward movement of the stem of the fork so as to cushion the blow transmitted to the frame.

A still further object in view is to provide a cushion head for motorcycles or bicycles formed with means whereby the front wheel may be easily steered without interfering with the cushioning effect of the cushion device.

In the accompanying drawing: Figure 1 is a fragmentary side view of the head of a bicycle or motorcycle frame together with associated parts, disclosing an embodiment of the invention; Fig. 2 is a section through Fig. 1 on line 2—2, the same being on an enlarged scale; Fig. 3 is a transverse horizontal section through Fig. 2 on line 3—3.

Referring to the accompanying drawing by numerals, 1 indicates the usual fork of a motorcycle or bicycle, which is provided with a stem 2 of substantially the usual construction except that it is not split at the top though it is provided with a threaded section 3. At the lower end of the stem 2 is arranged a cone 4 of any usual or preferred structure adapted to coact with the cup 5 for actuating the balls 6. The cup 5 may be formed separate or integral with a tube 7, which tube surrounds the stem 2, as shown in Fig. 2. The tube 7 is formed with a shoulder 8, which shoulder is always maintained above the lower line 9 of the head tube 10 so that the spring 11 cannot become accidentally lost. Threaded or otherwise rigidly secured to the upper end of the tube 7 is a cone 12 which acts in the double capacity, as cone for the balls 13 and as a stop arranged to engage the annular stop 14 connected with the head tube 10 by any suitable means, as for instance, rivets 15. This arrangement limits the downward movement of tube 7 and associated parts but does not affect their upward movement.

The stem 2 is provided with a filling member 16 having a squared hole arranged therein for accommodating a square bar 17, whereby whenever bar 17 is turned stem 2 will be turned and also the fork 1. A cone 18 is threaded on to the upper end of stem 2 and engages balls 13 so that the stem is supported at the top and at the bottom by antifriction means. The cone 18 is provided with an offset portion for receiving antifriction balls 18', said antifriction balls supporting a washer or ring 18'' on which spring 19 rests at one end, while the opposite end presses against cup 20 threaded at 21 to the upper part of the head tube 10. Both springs 11 and 19 resist the upward movement of the front fork while acting continually so as to maintain the cone 12 in engagement with stop 14. The cup 20 is provided with a round aperture therein for accommodating the round portion 22 of bar 17 so that the stop or washer 23 may rest against the upper part of the squared section 17 while washer 24 is held in place by nut 25 adjustably mounted on the threaded section 26.

A squared section 28 is provided on the bar 17 for accommodating the end 29 of the stem 30 of the handle bars 31. Whenever the handle bars 31 are operated the motion is positively transmitted through bar 17 to stem 2 and from thence to fork 1 by reason of the squared sections of the bar 17 and the squared opening in member 16. A suitable nut 32 is arranged at the extreme upper end of the bar 17 for holding the head 29 in position. By the construction and arrangement of bar 17 stem 2 may freely move up and down without interfering with the steering of the front fork or without causing the steering part to interfere with the spring 11 or with the spring 19.

What I claim is:

1. In a device of the character described, the combination with the front fork of a bicycle or motorcycle, of a stem rigidly connected therewith, said stem being provided with a threaded portion adjacent the upper end and a section at the upper end formed with a squared opening therein, a tubular member fitting over said stem, a spring urging said tubular member in one direction, a stop arranged in the head of said bicycle or motorcycle for limiting the movement of the spring in one direction, a stop connected with the threaded part of said stem for causing the stem to move with said tubular member, and means extending into the squared opening in said stem for steering said fork.

2. In a device of the character described, a bicycle or motorcycle frame head, an annular stop connected with said head interiorly thereof, a tubular member having a shoulder adjacent one end, and a stop adjacent the other adapted to engage said first mentioned stop, a spring surrounding said tubular member and pressing against the first mentioned stop and said shoulder for resiliently resisting an upward movement of said tubular member, a stem extending through said tubular member for supporting the same, a stop arranged at the upper end of said stem and coacting with the stop on said tubular member whereby the stem is prevented from accidental removal, and means adapted to be operated by the handle bars of said motorcycle or bicycle for turning said stem and the fork connected therewith.

3. In a device of the character described, a tubular head for a bicycle or motorcycle frame, said head being formed with a threaded portion at the upper end, a cap having a threaded section to engage the threads of said head, a stop arranged in said head and spaced from the ends thereof, a tubular member arranged in said head and provided with a shoulder adjacent the lower end and with a stop acting as a ball race at the upper end, said last mentioned stop engaging the first mentioned stop and thereby limiting the downward movement of the tubular member, a spring surrounding said tubular member and arranged with one end against the first mentioned stop and the other end against said shoulder for resiliently resisting upward movement of the tubular member, a stem extending through said tubular member and arranged with means at the lower end engaging the tubular members whereby when the stem is raised the tubular member will also be raised against the action of said spring, a cone mounted on the upper end of said stem and coacting with the stop acting as a ball race whereby the stem is limited in its downward movement, means arranged in said stem for forming a square opening, a bar having a square section fitting into said square opening, said bar being slidably mounted in said squared opening whereby the stem may freely move up and down without affecting the bar, said bar extending through said cap, and a handle bar structure connected with said bar for steering said stem and the usual fork connected thereto, said steering operation not interfering with the up and down movement of the stem and the tubular member by reason of the fact that said squared section is slidably mounted in said squared opening.

4. In a device of the character described, a tubular head for a motor cycle or bicycle frame, a stop arranged in said tubular head and spaced from the ends thereof, a tubular member formed with a stop at the upper end arranged in said tubular head and extending therefrom at the lower end, said tubular member having a shoulder, a spring surrounding said tubular member and engaging said shoulder and said stop for resiliently holding said tubular member in a given position, a stem for a front fork extending through said tubular member, antifriction means interposed between said stem and the lower end of said tubular member whereby the upward movement of the stem will cause an upward movement of the tubular member, a stop arranged at the upper end of said stem, antifriction means arranged between said last mentioned stop and the stop on said tubular member, means arranged in the stem providing a polygonal opening, a steering bar for slidingly fitting said opening and extending to a point above said tubular head, a cap connected with said tubular head and with said bar for preventing any longitudinal movement of said bar independent of the tubular head, and means for connecting said bar with steering handle bars, whereby said stem and said fork may be turned without interfering with the cushioning effect of said spring.

In testimony whereof I have signed my name to this specification in the presence of two subscribing witnesses.

PANCRAZIO GENOVESE.

Witnesses:
A. L. KITCHIN,
PHILIP D. ROLLHAUS.

Copies of this patent may be obtained for five cents each, by addressing the "Commissioner of Patents, Washington, D. C."